(12) United States Patent
Virdy et al.

(10) Patent No.: US 7,660,784 B1
(45) Date of Patent: Feb. 9, 2010

(54) GEOGRAPHICALLY RESOLVING A KEYWORD QUERY

(75) Inventors: Ajaipal Singh Virdy, Great Falls, VA (US); Lambert Arians, Ashburn, VA (US)

(73) Assignee: AOL LLC, Dulles, VA (US)

( * ) Notice: Subject to any disclaimer, the term of this patent is extended or adjusted under 35 U.S.C. 154(b) by 794 days.

(21) Appl. No.: 10/448,110

(22) Filed: May 30, 2003

(51) Int. Cl.
G06F 17/30 (2006.01)
(52) U.S. Cl. .............................. 707/3; 707/5
(58) Field of Classification Search .............. 707/3, 707/7, 104.1, 204, 5; 705/14; 380/258
See application file for complete search history.

(56) References Cited

U.S. PATENT DOCUMENTS

| | | | |
|---|---|---|---|
| 5,375,235 A | 12/1994 | Berry et al. | |
| 5,706,501 A | 1/1998 | Horikiri et al. | |
| 5,764,906 A | 6/1998 | Edelstein et al. | |
| 5,893,093 A | 4/1999 | Wills | |
| 5,930,474 A | 7/1999 | Dunworth et al. | |
| 5,956,711 A | 9/1999 | Sullivan et al. | |
| 5,970,489 A | 10/1999 | Jacobson et al. | |
| 5,991,739 A | 11/1999 | Cupps et al. | |
| 6,070,157 A | 5/2000 | Jacobson et al. | |
| 6,070,176 A | 5/2000 | Downs et al. | |
| 6,094,649 A | 7/2000 | Bowen et al. | |
| 6,101,496 A | 8/2000 | Esposito | |
| 6,151,624 A | 11/2000 | Teare et al. | |
| 6,202,065 B1 | 3/2001 | Wills | |
| 6,212,522 B1 | 4/2001 | Himmel et al. | |
| 6,256,633 B1 | 7/2001 | Dharap | |
| 6,263,333 B1 | 7/2001 | Houchin et al. | |
| 6,282,540 B1 | 8/2001 | Goldensher et al. | |
| 6,321,192 B1 | 11/2001 | Houchin et al. | |
| 6,336,117 B1 | 1/2002 | Massarani | |
| 6,343,290 B1 | 1/2002 | Cossins et al. | |
| 6,629,092 B1 | 9/2003 | Berke | |
| 6,947,935 B1* | 9/2005 | Horvitz et al. | 707/7 |
| 7,310,686 B2* | 12/2007 | Uysal | 709/245 |
| 2001/0020235 A1 | 9/2001 | Game | |
| 2002/0002552 A1 | 1/2002 | Schultz et al. | |
| 2002/0078036 A1* | 6/2002 | Miller et al. | 707/3 |
| 2002/0152205 A1* | 10/2002 | Hodam et al. | 707/3 |
| 2003/0061211 A1* | 3/2003 | Shultz et al. | 707/3 |

(Continued)

OTHER PUBLICATIONS

Govindarajan et al.., "Geo Viser. Geographic visualization of search engine results", Database and Expert Systems Applications, 1999. Proceedings, Sep. 1999, p. 269-273. Retrieved from the Internet:<URL: http://ieeexplore.ieee.org/stamp/stamp.jsp?tp=&arnumber=795177&isnumber=17217>.*

(Continued)

*Primary Examiner*—Shahid A Alam
*Assistant Examiner*—Dennis Myint
(74) *Attorney, Agent, or Firm*—Fish & Richardson P.C.

(57) ABSTRACT

Generating a keyword resolution includes receiving one or more keywords from a requestor and determining a geographic location to be associated with a resolution of at least one of the keywords against electronic information within at least one electronic information store. The keywords are resolved against the electronic information based, at least in part, on the geographic location and at least one matching result revealed through the resolution of the keywords based, at least in part, on the geographic location associated therewith is made perceivable.

20 Claims, 7 Drawing Sheets

U.S. PATENT DOCUMENTS

2004/0006557 A1* 1/2004 Baker et al. .................. 707/3
2004/0139107 A1* 7/2004 Bachman et al. ......... 707/104.1
2004/0260604 A1* 12/2004 Bedingfield .................. 705/14

OTHER PUBLICATIONS

Six et al., "Spatial searching in geometric databases", Proceedings. Fourth International Conference on Data Engineering, Feb. 1988, pp. 496-503. Retrieved from the Internet:<URL: http://ieeexplore.ieee.org/stamp/stamp.jsp?tp=&arnumber=105496&isnumber=3237>.*

Popp et al., Standards Track, "Common Name Resolution Protocol (CNRP)", Aug. 2002, pp. 1-40.

USPTO Non-Final Office Action issued in U.S. Appl. No. 10/448,110, mailed Apr. 2, 2009, 72 pages.

* cited by examiner

GEOGRAPHICALLY RESOLVING A KEYWORD QUERY

TECHNICAL FIELD

This document relates to geographically resolving a keyword query.

BACKGROUND

With the increased amount of information available over the Internet, it has become more difficult to limit the results of a search on the Internet to information that is useful to the person conducting the search. Frequently, when a search is performed, the most useful and relevant results may be scattered and buried among many less relevant results.

SUMMARY

In one general aspect, generating a keyword resolution includes receiving one or more keywords from a requestor and determining a geographic location to be associated with a resolution of at least one of the keywords against electronic information within at least one electronic information store. The keywords are resolved against the electronic information based, at least in part, on the geographic location and at least one matching result revealed through the resolution of the keywords based, at least in part, on the geographic location associated therewith is made perceivable.

Implementations may include one or more of the following features. For example, matching results that represent one or more candidates for resolution of the one or more keywords received may be identified. It may be determined whether there is one or more matching results. The matching result may be made perceivable when there is only one matching result. The keywords may be resolved based, at least in part, on the geographic location when there is more than one resolution.

In one implementation, only the matching result may be made perceivable. In another implementation, a single matching result may be made perceivable.

The geographic location may be received from the requestor. The geographic location may be determined based, at least in part, on a geographic location of the requestor. The geographic location of the requestor may be determined by accessing a profile associated with the requestor that contains the geographic location of the requestor. The geographic location of the requestor may be determined without soliciting geographic location information from the requestor for purposes of resolving the keyword. The geographic location of the requestor may be determined without soliciting geographic location information from the requestor contemporaneously with the receipt or resolution of the keywords. The matching result may be displayed. The requestor may override the determined geographic location.

In one implementation, the keywords and the geographic location may be resolved against the electronic information. In another implementation, a display of the matching result may be organized based on the determined geographic location.

In yet another implementation, the electronic information may be filtered based on the determined geographic location. The electronic information may be filtered based on the determined geographic location before resolving the keywords against the electronic information. Alternatively, the electronic information may be filtered based on the determined geographic location after resolving the keywords against the electronic information.

In another implementation, the matching result may be sorted based on the determined geographic location.

The electronic information within the electronic information store may include one or more keywords, with each of the keywords associated with a geocode and one or more resolution results. A geocode may be associated with the determined geographic location and the geocode associated with the determined geographic location may be used to resolve against the geocodes associated with the keywords within the electronic information store. The geocode may be used to broaden and/or narrow a geographic scope of the query term resolution. The requestor may disable the geocode.

These general and specific aspects may be implemented using a system, a method, or a computer program, or any combination of systems, methods, and computer programs.

Other features will be apparent from the description and drawings, and from the claims.

DETAILED DESCRIPTION

Figure 1:
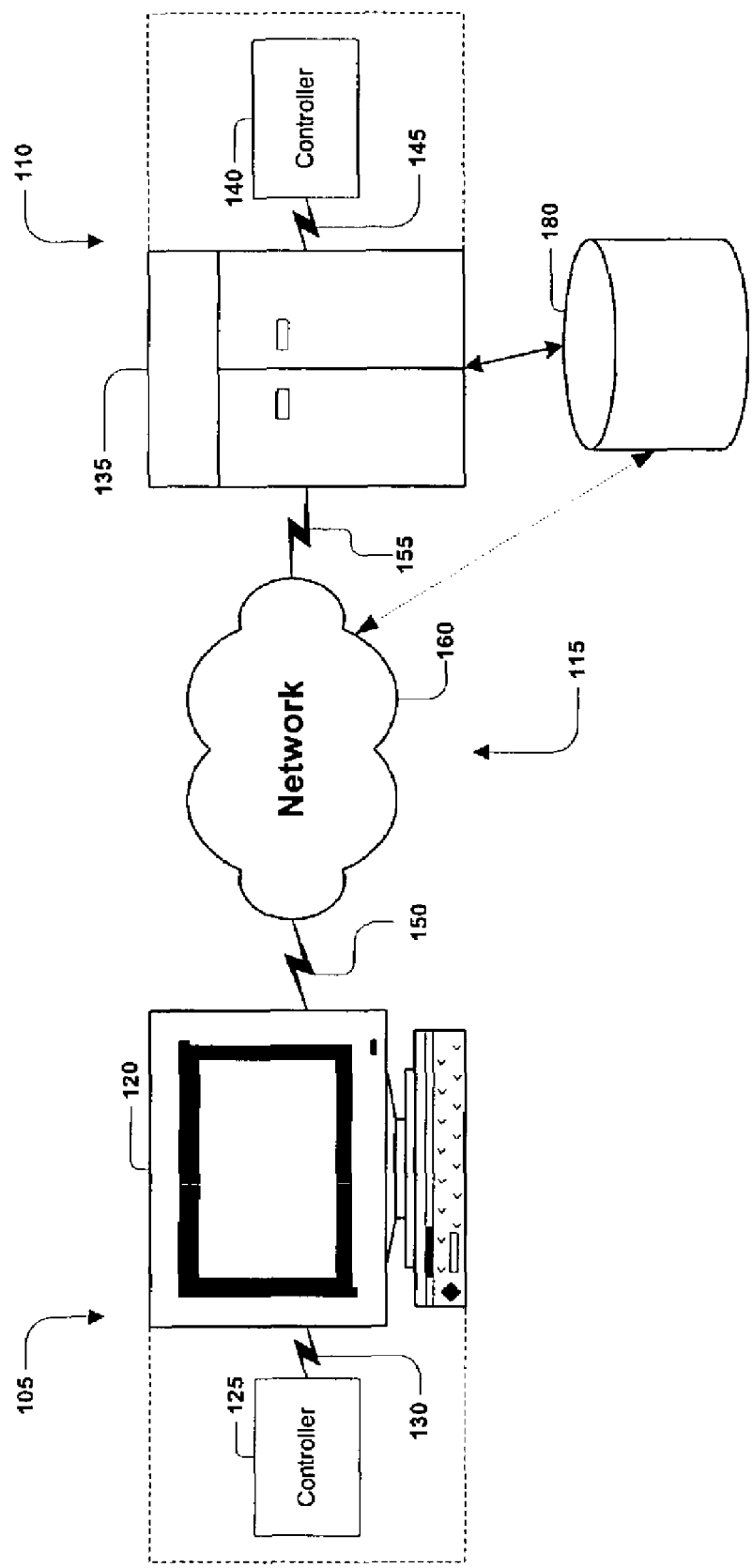
FIG. 1 is a block diagram of a communications system.

In general, a keyword query typically resolves to a predetermined match, unlike a general query term search that typically yields a list of several results that are ordered based on the frequency of occurrence of the query term. For example, in the Internet context, a keyword typically resolves to the same match each time that it is resolved. For instance, the keyword "AOL" may resolve to the same website each time that it is resolved, namely, www.aol.com. It is possible that a keyword query alone may resolve to more than one predetermined match. In one implementation, a single keyword query may resolve to several potential matches, where a single match may be selected from among the potential matches based on geographic location for the query submitted. For example, the keyword "pizza" initially may resolve to several websites that differ based on geographic location, and a single website may be selected from among the different websites by taking a geographic location into account.

In another implementation, "sponsored" keywords may resolve to one or more matches. When a sponsored keyword is received, the sponsored keyword resolves to one or more specific links. Typically, the link owner pays a fee to have the keyword resolve to the link for its web site or for its links to be shown as one of the first few links that the keyword displays as a match. For example, when the keyword query "music" is entered, the person entering the keyword may be displayed links to BMG, MySimon.com, and BizRate.com, because the owners of these links have paid a fee to have the keyword music resolve to their links. The resolved links are made perceivable not because of the number of occurrences of the word "music" in the text displayed at these sites or included in their metadata, but instead these links are displayed because it has been predetermined that when the keyword "music" is received for resolution, then that keyword will resolve to these three links and only these three links. When the search query "music" is entered in a search engine, as opposed to a keyword resolution engine, then it is possible that thousands of results will be displayed to the user, instead of the three sponsored keyword resolution results. By taking a geographic location into account when resolving keywords, the same keyword could be made to resolve to geographically relevant results.

Keyword resolution techniques are described with respect to Tables 1 and 2, illustrating some of the distinctions between keyword resolution and conventional searching techniques. Table 1 below illustrates an exemplary keyword resolution where the received keyword resolves to a single match. In this example, when the keyword "AOL" is received, it resolves to the website www.aol.com. Similarly, when the keyword "pizza" is received, it resolves to the website www.pizza.com. As illustrated in Table 1, the keywords "AOL" and "pizza" only resolve to a single match and the resolution of the received keywords is based on a predetermined solution for the keyword resolution. The resolution of the keyword does not depend on the frequency of occurrence of the keyword at the particular solution or other criteria that may be used by a search engine. Consequently, the resolution of a particular keyword may be easily changed to resolve to a different website.

TABLE 1

| KEYWORD | RESOLUTION |
| --- | --- |
| AOL | www.aol.com |
| pizza | www.pizza.com |

Table 2 below illustrates an exemplary keyword resolution where the received keyword resolves to a different resolution based on taking a geographic location into account. In this example, when the keyword "pizza" is received, it may resolve to different single matches that differ based on geographic location. For instance, when the keyword "pizza" is received and the desired geographic location is determined to be Dulles, Va., then the keyword "pizza" resolves to www.papajohns.com/dulles. When the same keyword "pizza" is received and the desired geographic location is determined to be Reston, Va., then the same received keyword "pizza" resolves to www.pizzahut.com/reston, which is different than the solution in the previous example because the desired geographic locations are different. Likewise, when the same keyword "pizza" is received and the desired geographic location is determined to be Columbia, Md., then the same received keyword "pizza" resolves to www.pizzahut.com/columbia. As illustrated in Table 2, the resolution of the keyword "pizza" resolves to a predetermined solution based on taking geographic location into account. As discussed more fully below, the desired geographic location may be determined in various ways and may be used in various ways to effect the keyword resolution process including selection of keyword resolution to a resolution specified for a closest geographic location, or to a default keyword resolution when no other keyword resolution is specified for a specified or known geographic location of interest.

TABLE 2

| KEYWORD | GEOGRAPHIC LOCATION | RESOLUTION |
| --- | --- | --- |
| pizza | Dulles, VA | www.papajohns.com/dulles |
| pizza | Reston, VA | www.pizzahut.com/reston |
| pizza | Columbia, MD | www.pizzahut.com/columbia |

Figure 2:
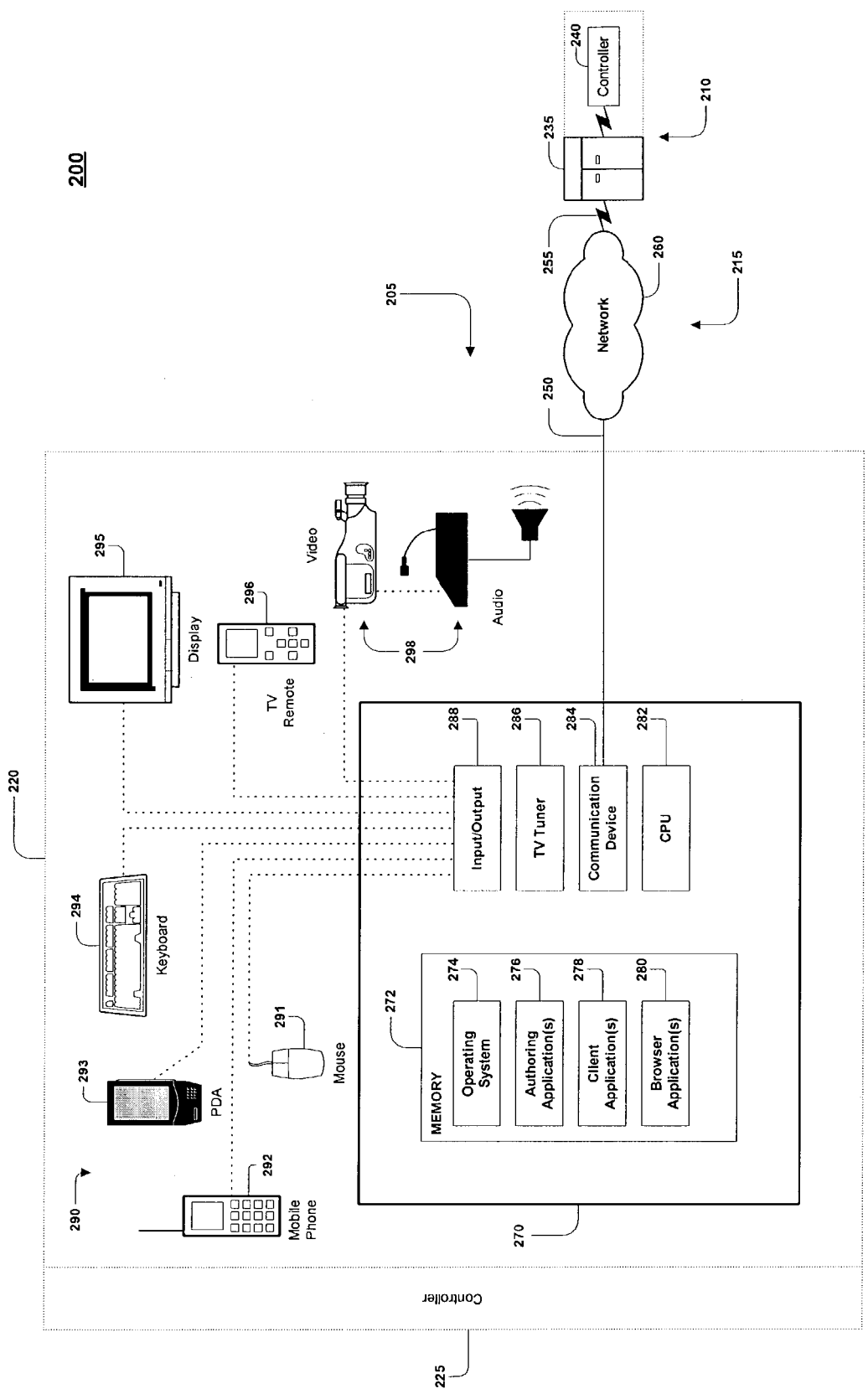
FIG. 2 is an expansion of the block diagram of FIG. 1.

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requestor system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more LANs ("Local Area Networks") and/or one or more WANs ("Wide Area Networks").

The requestor device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requestor controller 125, the provider device 135, and the provider controller 140 each typically includes one or more hardware components and/or software components. An example of a requestor device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requestor device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requestor device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information that may be in an indexed and/or searchable format.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requestor device 220 by accessing the delivery network 260 and communicating with the provider system 210. Furthermore, the requestor system 205 may include one, some or all of the components and devices described above.

Figure 3:
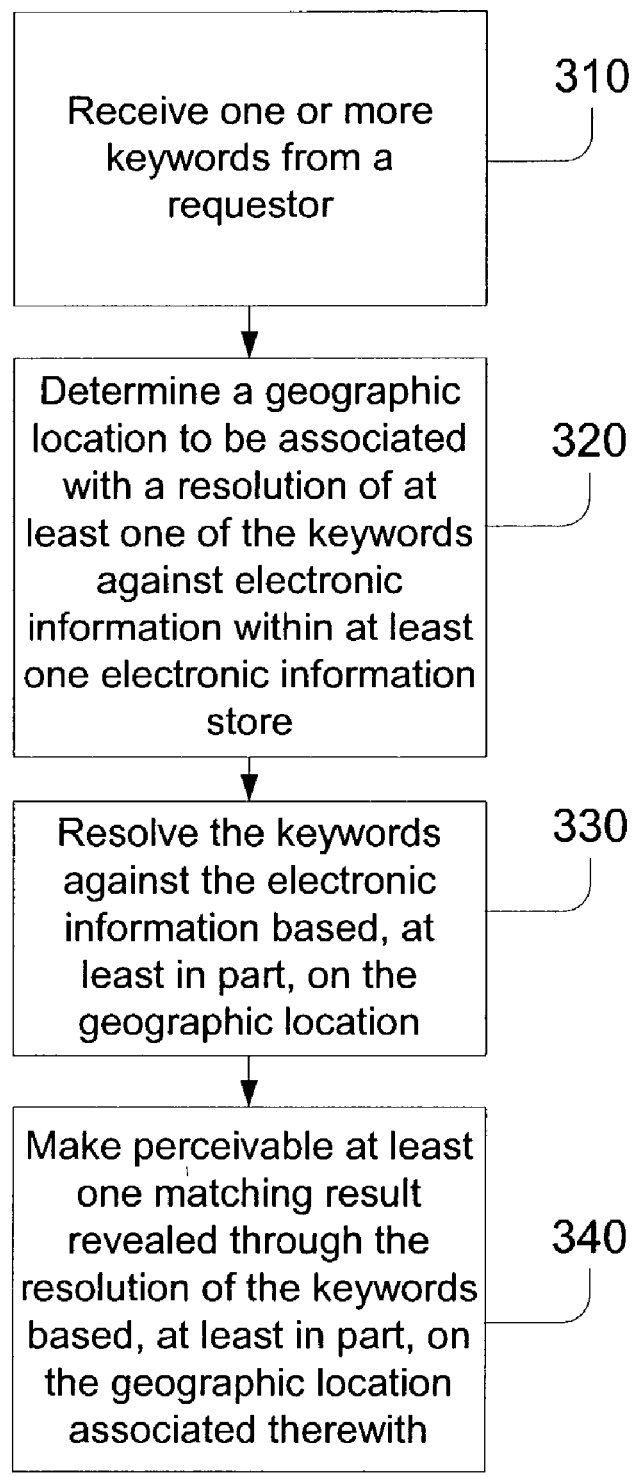
FIGS. 3-7 are flow charts of exemplary processes for identifying electronic information implemented by the communications system of FIGS. 1 and 2.

Referring to FIG. 3, an exemplary process 300 may be used to generate a keyword resolution. Process 300 typically includes receiving one or more keywords from a requestor (step 310) and determining a geographic location to be associated with a resolution of at least one of the keywords against electronic information within at least one electronic information store (step 320). The keywords are resolved against the electronic information based, at least in part, on the geographic location (step 330) and at least one matching result revealed through the resolution of the keyword based, at least in part, on the geographic location associated therewith is made perceivable (step 340).

Keywords typically are received (step 310) from a requestor system 105 or 205 as shown and described in FIGS. 1 and 2. Keywords generally include text defined by letters and/or numbers. However, a keyword also may include other searchable content, such as symbols, other alphanumeric characters, and geometric constructs (e.g., arcs); Boolean operators (e.g., AND, OR, ADJ, NOT, NEAR) generally used to define relationships between keywords; parentheses and quotation marks generally used to indicate precision and to group keywords; wild card characters (e.g., ? and *) generally used to represent a portion of a keyword; and concept operators (e.g., !) generally used to broaden a keyword or phrase to a list of related words related to the keyword or phrase in order to resolve the keyword against electronic information using these related words.

The geographic location to be associated with a resolution of at least one of the keywords may be determined in different ways (step 320). In an exemplary implementation, the geographic location may be provided by the requestor. When the requestor provides the desired geographic location, a cookie or other identifier may be associated with the requestor and used in future keyword resolutions requested by the requestor. For instance, a cookie may be used to store the geographic location provided by the requestor on the requestor system 105 or 205, or a token may be associated with messages from the requestor to reflect or enable lookup of geographic location information thereafter. The requestor may update the geographic location at any time when performing a subsequent keyword resolution.

A graphical user interface (GUI) may be used to provide the requestor an interface to input a desired geographic location. The GUI may include blank text boxes, drop down menus selection buttons, and other types of input areas. The geographic location may be input in the same input area that the keywords are entered (e.g., the same blank text block) or the geographic location may be input in a separate input area from the keywords (e.g., separate blank text blocks).

The geographic information may include information related to an address, such as a street name, a city, a state, a country, and/or a zip code. The geographic information also may include information related to a phone number, such as an area code. Other types of geographic information may include geographic coordinates (e.g., latitude and longitude), a continent, a country, a region, a major metropolitan area, a local metropolitan area, a state, a local city, and/or a local neighborhood.

In another exemplary implementation, the geographic location may be determined by using geographic information already known about the requestor. For example, the geographic location may be determined by accessing an electronic information store containing a requestor profile that includes geographic information about the requestor, where the requestor profile was created for a purpose other than determining the geographic location of the requestor to resolve the keywords. Thus, the geographic location of the requestor may be determined without soliciting geographic location information from the requestor for purposes of resolving the keyword. Additionally, the geographic location of the requestor may be determined without soliciting geographic location information from the requestor contemporaneously with the receipt or resolution of the keywords.

For example, the information in the requestor profile may include information that was obtained about the requestor during the subscription process for services from an online service provider or an Internet service provider (ISP). Such information may include demographic information about the requestor including, for example, a user identity's name, billing address, electronic mail (e-mail) address, phone number, gender, date of birth, and other demographic information. From the information provided by the requestor, such as address information, other geographic location information fields in the requestor profile may be populated automatically. For example, if the requestor provides a city/state and/or a zip code, then other types of geographic information may be determined and populated within the requestor profile. The other types of geographic location information may include, for example, geographic coordinates (e.g., latitude and longitude), a continent, a country, a region, a major metropolitan area, a local metropolitan area, and/or a local neighborhood.

In one implementation, a geocode may be created automatically from the information contained in the requestor profile and associated with the requestor. For example, a geocode may be constructed based on a geographic taxonomy of different geographic nodes, where each node is assigned a code resulting in a string that forms the geocode. One exemplary geographic taxonomy may include the following geographic nodes: continent<country<region<major metropolitan area<local metropolitan area<state<local city<local neighborhood. Thus, the requestor's geocode may be used during the keyword resolution process to generate geographically relevant results. In one implementation, web sites and web pages on the Internet also may be associated with a geocode, which may be used to help obtain geographically relevant results to a keyword resolution request based on the geographic location of the requestor.

In one implementation, the geocode may be used to broaden and/or narrow the geographic scope of the keyword resolution. For instance, the geocode may be used to define the scope of the geography of a physical address contained in a web site, thus making keyword resolutions more robust. Likewise, the geocode may be used to define the scope of the geography of a physical address associated with a particular requestor.

In another implementation, the information in the requestor profile may include information that was obtained about the requestor during an online purchasing transaction and/or information that was obtained based on monitoring requestor interactions over the communication network, such as requestor browsing and purchasing habits.

In yet another implementation, the geographic location of the requestor may be determined by determining the Internet protocol (IP) address or service provider gateway used by the requestor and determining the geographic location of the requestor based on the IP address or the location of the service provider gateway.

In this manner, information previously obtained for purposes not related to satisfying keyword resolutions, and before not useful for such purpose, may be leveraged to help generate or at least present results that are more relevant or more relevantly ordered for the requestor.

The keywords may be resolved against the electronic information based, at least in part, on the geographic location (step 330). The determined geographic location may be used in different ways to effect the outcome of the keyword resolution. In an exemplary implementation, the geographic location is used as part of the resolution to be resolved against electronic information within the electronic information store. In another exemplary implementation, the geographic location is not included as part of the resolution, but the determined geographic location may be used to narrow the field of candidates against which the keyword will be applied before resolution of the keyword. In another exemplary implementation, the geographic location is not included as part of the resolution, but the results from the keyword resolution are filtered based on the geographic location. In still another exemplary implementation, the geographic location is not included as part of the resolution, but the results from the keyword resolution are sorted for presentation based on the geographic location. In yet another exemplary implementation, the geographic location is used as part of the resolution and the geographic location also is used to sort the results so that results with the highest geographic relevance are presented first, even among keyword results obtained based on geographic data. Still other exemplary implementations may include identifying a closest match for a keyword resolution or resorting to a default if no direct matches exist. Some of these exemplary implementations are illustrated below in FIGS. 4-6. In yet another implementation, different geocodes may be assigned to the same keyword. By assigning different geocodes to the same keyword, the same keyword resolves to a different result based on the geocode.

Figure 4:
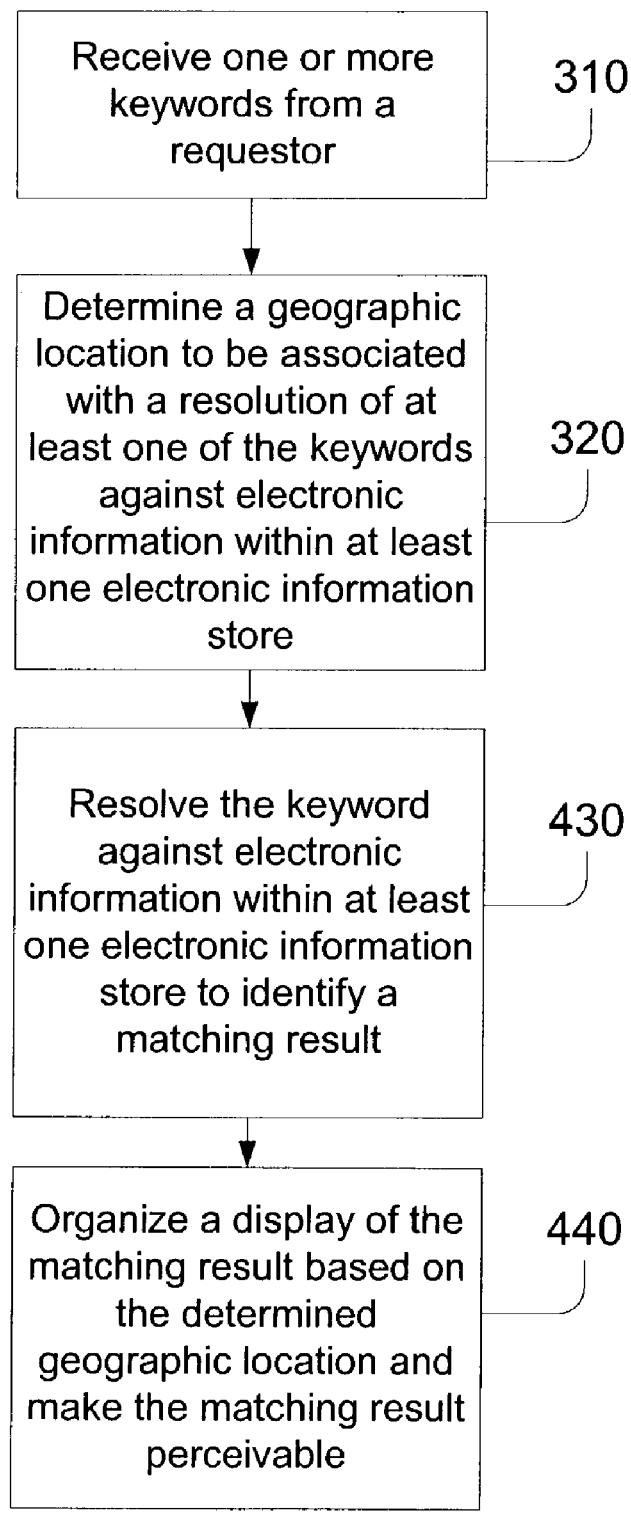

FIG. 4 illustrates another exemplary process 400 for identifying electronic information based on a keyword, where the geographic location of the requestor is used to organize keyword results. In this exemplary implementation, process 400 includes receiving at least one keyword (step 310) and determining a geographic location to be associated with a resolution of at least one of the keywords against electronic information within at least one electronic information store (step 320). The keyword is resolved against electronic information within at least one electronic information store to identify a matching result (step 430), and the matching result is organized based on the determined geographic location and made perceivable (step 440).

In exemplary process 400, steps 310 and 320 of FIG. 4 are comparable to steps 310 and 320 described above with respect to FIG. 3. In this exemplary implementation, the keyword is resolved against the electronic information (step 430) and any resulting matches are organized based on the determined geographic location (step 440). For example, the result may be organized by filtering and/or ranking the results based on the determined geographic location (step 440).

For example, the keyword "music" may be entered in a GUI and received for resolving against the electronic content accessible through the GUI (step 310). In this example, the geographic location is determined to be Dulles, Va. based on either geographic information provided by the requestor or geographic information previously known about the requestor, such as geographic information contained in the requestor profile, and is not used to filter the electronic content (step 320). Instead, the keyword "music" is resolved against the electronic content (step 430) and then the determined geographic location is used to organize any resulting matches by organizing and/or ranking the results (step 440). In this example, the results are ranked based on the determined geographic location such that results for the keyword music related to Dulles, Va., are at the top of the results list and results related to geographic areas most proximate to Dulles, and so forth.

In one implementation, an algorithm may be used to determine the ranking of results that accounts for the different possible relevancy situations that may occur. For example, the algorithm accounts for situations where there are a high number of relevant results based on the keyword resolution, but of those results obtained, there is a low relevancy to the determined geographic location. In this exemplary situation, the results may be ranked based on the closest proximity to the determined geographic location, with the results having the closest proximity to the actual geographic location being displayed first. In another example, the algorithm accounts for situations where there are a low number of relevant results based on the keyword resolution and, of those results obtained, there is a high relevancy to the determined geographic location. In this exemplary situation, the most relevant results based on the keyword with the closest proximity to the determined geographic location may be displayed first.

Figure 5:
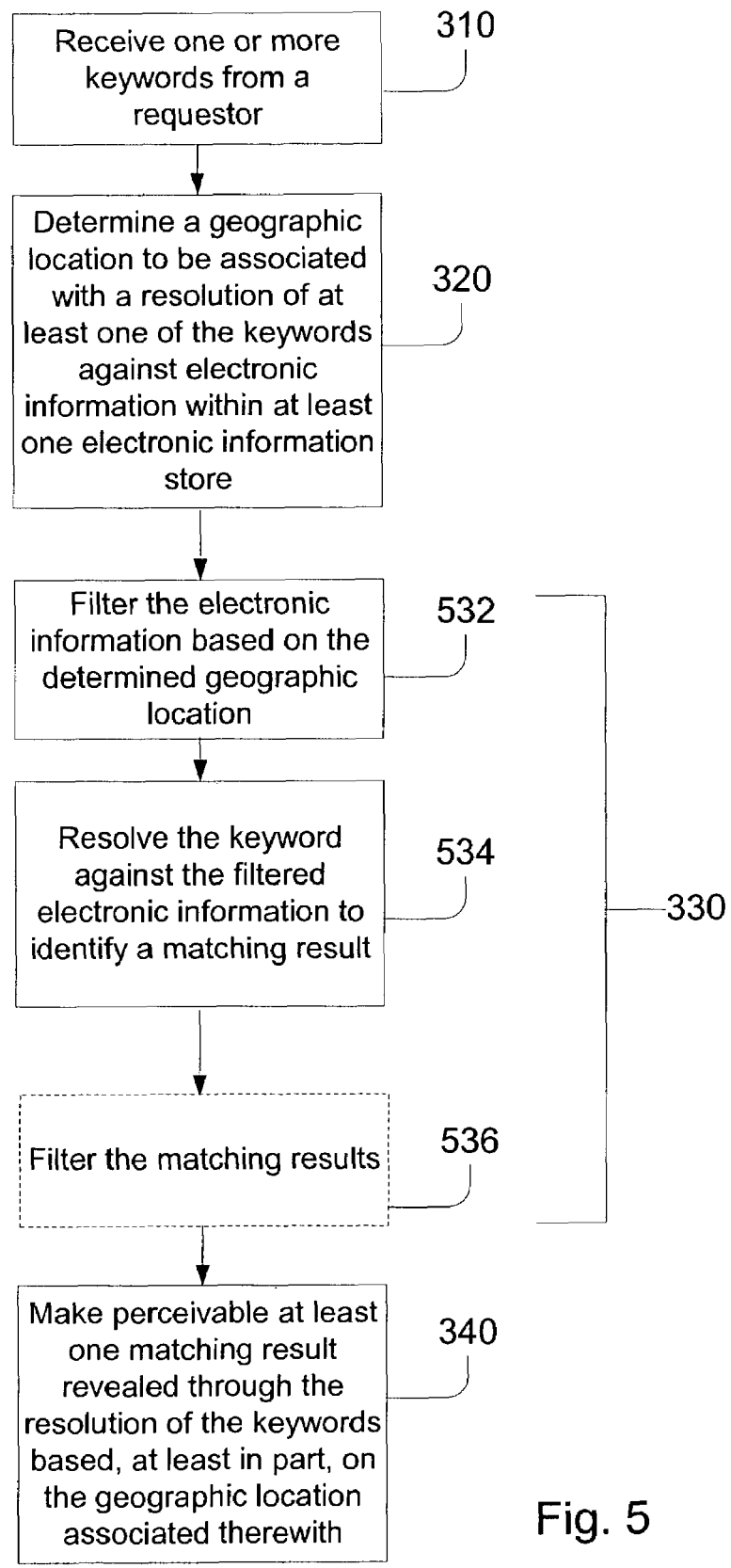

FIG. 5 illustrates another exemplary process 500 for identifying electronic information based on a keyword in which the determined geographic location is used as a filter. In this exemplary implementation, the process 500 includes receiving at least one keyword (step 310) and determining a geographic location to be associated with a resolution of at least one of the keywords against electronic information within at least one electronic information store (step 320). The electronic information is filtered based on the determined geographic location (step 532). The keyword is resolved against the filtered electronic information to identify a matching result (step 534) and at least one matching result revealed through the resolution of the keyword based, at least in part, on the geographic location associated therewith is made perceivable (step 340).

In exemplary process 500, steps 310, 320, and 340 of FIG. 5 are comparable to steps 310, 320, and 340 described above with respect to FIG. 3. Steps 532, 534, and 536 are an exemplary modification or amplification of step 330 described above with respect to FIG. 3. The process 500 differs in that the determined geographic location may be used to narrow the field of candidates against which the keyword will be applied before resolution of the keyword (step 532). For instance, subcategories appropriate for the determined geographic location may be selected to filter the universe of potentially searchable electronic information based on the determined geographic location. In this manner, the results include only the electronic information that matches the determined geographic location.

For example, the keyword "music" may be entered in a GUI and received for resolving against the electronic content accessible through the GUI (step 310). In this example, the geographic location is determined to be Dulles, Va. (step 320). The determined geographic location is used to filter the electronic content based on the geographic location before the keyword "music" is resolved against the electronic content (step 532). After the determined geographic location is used to filter the electronic content (step 532), the keyword is resolved against remaining and geographically relevant the electronic content (step 534). In this example, the results are made perceivable where the determined geographic location was taken into account before the keyword was resolved.

A similar approach may involve using the determined geographic location to filter results of a resolution conducted based on the geographic location (see optional step 536 that may be used instead of step 532). For example, the determined geographic location may be taken into account after the keyword is resolved and the results are filtered based on the determined geographic location. For instance, the results to the keyword "music" may be filtered based on the determined geographic location before being perceived by the requestor so that only the results that are relevant to the geographic location are perceived.

Figure 6:
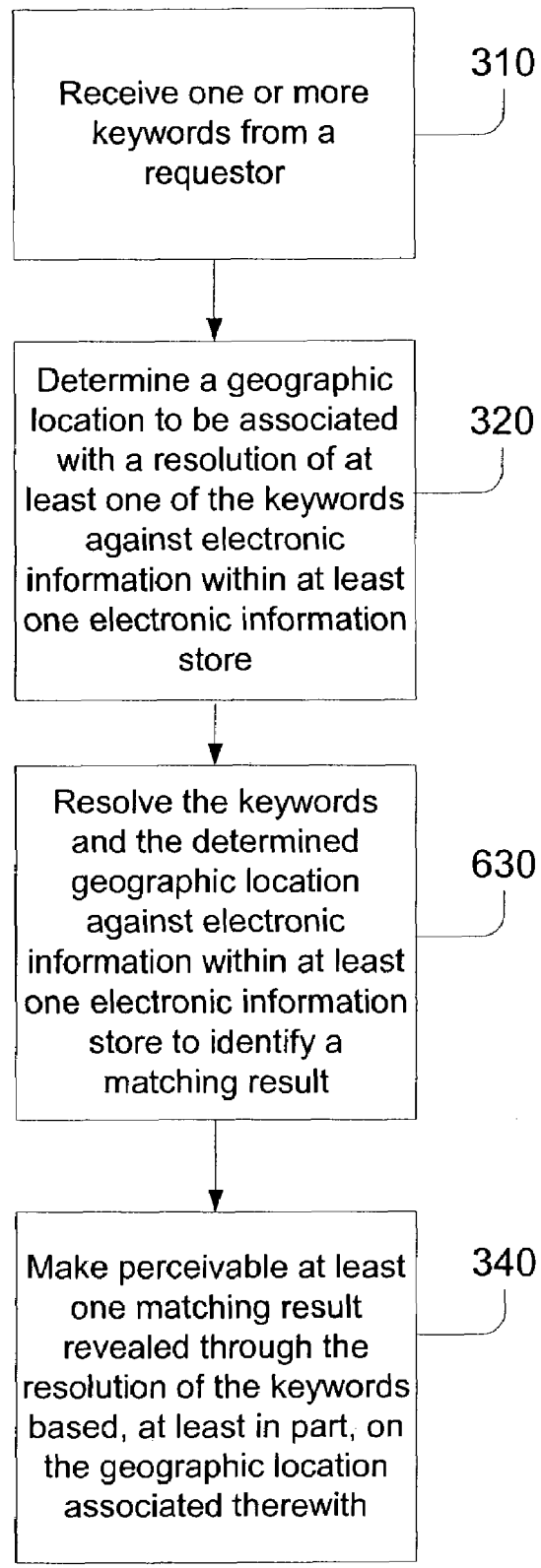

FIG. 6 illustrates another exemplary process 600 for identifying electronic information based on a keyword, where the geographic location is used as part of the resolution along with the received keyword. In this exemplary implementation, process 600 includes receiving at least one keyword (step 310) and determining a geographic location to be associated with a resolution of at least one of the keywords against electronic information within at least one electronic information store (step 320). The keyword and the determined geographic location are resolved against electronic information within at least one electronic information store to identify a matching result (step 630), and at least one matching result revealed through the resolution of the keyword based, at least in part, on the geographic location associated therewith is made perceivable (step 340).

In exemplary process 600, steps 310, 320, and 340 of FIG. 6 are comparable to steps 310, 320, and 340 described above with respect to FIG. 3. In one implementation, the determined geographic location is resolved against electronic information within the electronic information store (step 630). For example, the electronic information may be designated, associated, identified, and/or tagged (e.g., the information may be a metatag and/or a geographic identification (geo ID) code that has been manually or automatically generated) with a geographic reference such that the determined geographic location (step 320) may be resolved against the geographic reference along with the keyword. In this instance, different results to the same keyword may be obtained for different requestors based on different geographic locations. For example, a GUI may include an input interface to enter a keyword to be resolved against electronic content. If the keyword "music" is entered by a requestor and the geographic location is determined to be Dulles, Va., then the keyword may be resolve to one or more matches for a web site related to music in Dulles, Va. However, if the same keyword is entered by a requestor and the geographic location is determined to be Virginia Beach, Va., then the keyword may resolve to one or more matches for a web site related to music located in Virginia Beach, Va.

In another exemplary implementation, in addition to the determined geographic location being resolved against electronic information along with the keyword to identify a matching result (step 630), the geographic location also may be used to filter the results (step 536) and/or organize a display of the results (step 440).

Figure 7:
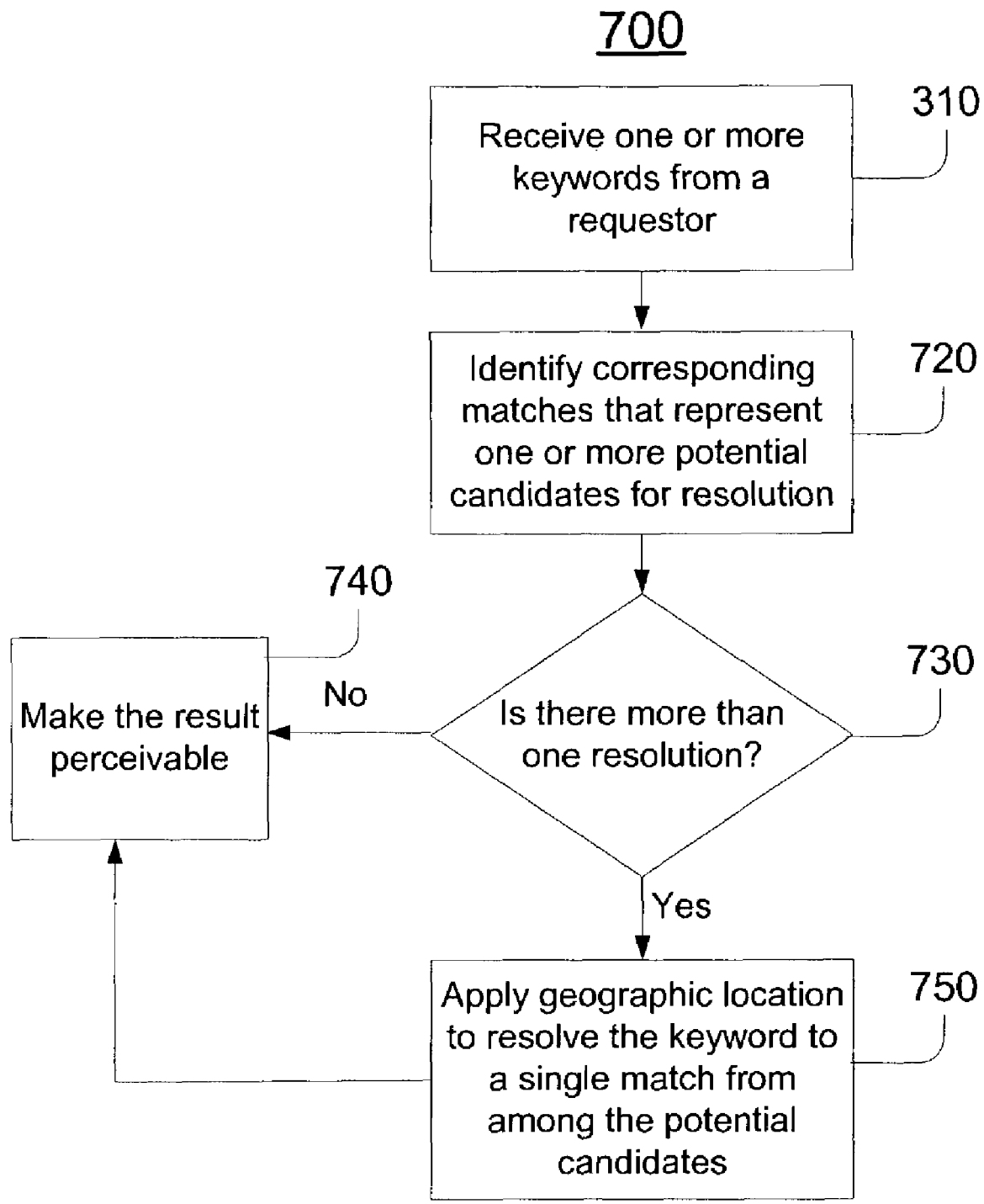

FIG. 7 illustrates another exemplary process 700 for identifying electronic information based on a keyword, where the geographic information is applied to resolve the keyword to a single match from among several potential matches. In this exemplary implementation, process 700 includes receiving one or more keywords from a requestor (step 310) and identifying corresponding matches that represent one or more potential candidates for resolution (step 720). If there is only one resolution (step 730), then the result is made perceivable (step 740). If there is more than one resolution (step 730), then geographic information is applied to resolve the keyword to a single match from among the potential candidates (step 750) and that result is made perceivable (step 740). The processes described with respect to step 730 of FIG. 7 may be employed to effect the resolution of step 750.

In exemplary process 700, step 310 of FIG. 6 is comparable to step 310 described above with respect to FIG. 3. Exemplary process 700 may be used as one implementation to resolve the situation when there is more than one potential resolution for the same keyword, such as the keyword "pizza" described above with respect to Table 2. For example, for the received keyword "pizza" (step 310), there are three potential corresponding matches that represent three potential candidates for resolution (step 720), namely, www.papajohns.com/dulles; www.pizzahut.com/reston; and www.pizzahut.com/columbia. Since there is more than one resolution (step 730), a geographic location is applied to resolve the keyword to a single match from among the potential candidates (step 750) and then the result is made perceivable (step 740). The particular geographic location that is applied may be determined as described above with respect to step 320 of FIG. 3.

As discussed above, FIGS. 3-6 represent one distinct method of keyword resolution with some different exemplary variations of the method, whereby geographic location information is applied for a keyword without or before determining whether it is necessary for resolution (e.g., whether more than one potential resolution of a keyword exists). FIG. 7, as described above, represents an alternative distinct method of keyword resolution that differs from the distinct method and various exemplary implementations described with respect to FIGS. 3-6. In the method represented by FIG. 7, an initial attempt is made to resolve the keywords and thereafter it is determined whether it is necessary to identify and use geographic location information to resolve the keyword to a single match from among the potential candidates.

The described systems, methods, and techniques may be implemented in digital electronic and/or analog circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

For example, the requestor may override the determined geographic location that is used for resolving a keyword query. The requestor may be presented with one or more options to change the determined geographic location that is accessed from the requestor profile to a different geographic location to be used for resolving a keyword query.

In another exemplary implementation, the requestor may disable and/or override a geocode associated with the requestor and that may be used for resolving a query term.

What is claimed is:

1. A method of resolving a keyword to a single match comprising:
   storing, in electronic storage, a keyword table that maps keywords to predetermined matches, each record in the keyword table having a distinct combination of keyword and geographic location such that applying, to the keyword table, a keyword with a particular geographic location resolves to only a single predetermined match;
   receiving a keyword from a requestor;
   identifying, from the keyword table that maps keywords to predetermined matches, one or more predetermined matches included in one or more records in the keyword table that correspond to the received keyword; and
   resolving the identified one or more predetermined matches included in the one or more records in the keyword table that correspond to the received keyword to a single predetermined match by:
      determining whether the identified one or more predetermined matches included in the one or more records in the keyword table that correspond to the received keyword include a single predetermined match or multiple predetermined matches;
      in response to determining that the identified one or more predetermined matches included in the one or more records in the keyword table that correspond to the received keyword include a single predetermined match:
  accessing the single predetermined match; and
  making the single predetermined match perceivable without accounting for a geographic location of the requestor in making the single predetermined match perceivable; and
in response to determining that the identified one or more predetermined matches included in the one or more records in the keyword table that correspond to the received keyword include multiple predetermined matches included in multiple records in the keyword table that correspond to the received keyword:
  determining to identify and use the geographic location of the requestor to resolve the multiple records in the keyword table to a single predetermined match in response to the determination that the identified one or more predetermined matches include multiple predetermined matches;
  determining the geographic location of the requestor;
  comparing the geographic location of the requestor to geographic location information included in the multiple records in the keyword table that correspond to the received keyword;
  based on comparison results, selecting, from among the multiple predetermined matches included in the multiple records in the keyword table, a single predetermined match that is included in a record, from among the multiple records in the keyword table, having geographic location information that most closely matches the geographic location of the requestor; and
  making the selected single predetermined match perceivable.

2. The method of claim 1 wherein determining the geographic location of the requestor comprises receiving a geographic location submitted by the requestor.

3. The method of claim 1 wherein determining the geographic location of the requestor comprises determining a geographic location of the requestor based on a current geographic location of the requestor.

4. The method of claim 1 wherein determining the geographic location of the requestor comprises accessing a profile associated with the requestor that includes the geographic location of the requestor.

5. The method of claim 1 wherein determining the geographic location of the requestor comprises determining the geographic location of the requestor without soliciting geographic location information from the requestor.

6. The method of claim 1 wherein determining the geographic location of the requestor comprises determining a current geographic location of the requestor based on an Internet protocol address being used by the requestor.

7. The method of claim 1 wherein making the single predetermined match perceivable without accounting for a geographic location of the requestor in making the single predetermined match perceivable comprises displaying the single predetermined match without accounting for the geographic location of the requestor, and making the selected single predetermined match perceivable comprises displaying the selected single predetermined match.

8. The method of claim 1 wherein making the single predetermined match perceivable without accounting for a geographic location of the requestor in making the single predetermined match perceivable comprises making only the single predetermined match perceivable without accounting for the geographic location of the requestor, and making the selected single predetermined match perceivable comprises making only the selected single predetermined match perceivable.

9. The method of claim 1 further comprising:
maintaining general search information in electronic storage; and
maintaining sponsored search information in electronic storage, the sponsored search information being different than the general search information and including sponsored keywords that resolve to specific matches associated with sponsors of the sponsored keywords, the sponsored search information including the stored keyword table.

10. The method of claim 9 further comprising:
performing a general search on the general search information based on the received keyword; and
making perceivable general search results identified based on performing the general search on the general search information.

11. A system including at least one processor configured to perform operations comprising:
storing, in electronic storage, a keyword table that maps keywords to predetermined matches, each record in the keyword table having a distinct combination of keyword and geographic location such that applying, to the keyword table, a keyword with a particular geographic location resolves to only a single predetermined match;
receiving a keyword from a requestor;
identifying, from the keyword table that maps keywords to predetermined matches, one or more predetermined matches included in one or more records in the keyword table that correspond to the received keyword; and
resolving the identified one or more predetermined matches included in the one or more records in the keyword table that correspond to the received keyword to a single predetermined match by:
  determining whether the identified one or more predetermined matches included in the one or more records in the keyword table that correspond to the received keyword include a single predetermined match or multiple predetermined matches;
  in response to determining that the identified one or more predetermined matches included in the one or more records in the keyword table that correspond to the received keyword include a single predetermined match:
    accessing the single predetermined match; and
    making the single predetermined match perceivable without accounting for a geographic location of the requestor in making the single predetermined match perceivable; and
  in response to determining that the identified one or more predetermined matches included in the one or more records in the keyword table that correspond to the received keyword include multiple predetermined matches included in multiple records in the keyword table that correspond to the received keyword:
    determining to identify and use the geographic location of the requestor to resolve the multiple records in the keyword table to a single predetermined match in response to the determination that the identified one or more predetermined matches include multiple predetermined matches;
    determining the geographic location of the requestor;
    comparing the geographic location of the requestor to geographic location information included in the multiple records in the keyword table that correspond to the received keyword;

based on comparison results, selecting, from among the multiple predetermined matches included in the multiple records in the keyword table, a single predetermined match that is included in a record, from among the multiple records in the keyword table, having geographic location information that most closely matches the geographic location of the requestor; and making the selected single predetermined match perceivable.

12. The system of claim 11 wherein determining the geographic location of the requestor comprises receiving a geographic location submitted by the requestor.

13. The system of claim 11 wherein determining the geographic location of the requestor comprises determining a geographic location of the requestor based on a current geographic location of the requestor.

14. The system of claim 11 wherein determining the geographic location of the requestor comprises accessing a profile associated with the requestor that includes the geographic location of the requestor.

15. The system of claim 11 wherein determining the geographic location of the requestor comprises determining the geographic location of the requestor without soliciting geographic location information from the requestor.

16. The system of claim 11 wherein determining the geographic location of the requestor comprises determining a current geographic location of the requestor based on an Internet protocol address being used by the requestor.

17. The system of claim 11 wherein making the single predetermined match perceivable without accounting for a geographic location of the requestor in making the single predetermined match perceivable comprises displaying the single predetermined match without accounting for the geographic location of the requestor, and making the selected single predetermined match perceivable comprises displaying the selected single predetermined match.

18. The system of claim 11 wherein making the single predetermined match perceivable without accounting for a geographic location of the requestor in making the single predetermined match perceivable comprises making only the single predetermined match perceivable without accounting for the geographic location of the requestor, and making the selected single predetermined match perceivable comprises making only the selected single predetermined match perceivable.

19. The system of claim 11 wherein the at least one processor is configured to perform operations further comprising:

maintaining general search information in electronic storage; and maintaining sponsored search information in electronic storage, the sponsored search information being different than the general search information and including sponsored keywords that resolve to specific matches associated with sponsors of the sponsored keywords, the sponsored search information including the stored keyword table.

20. The system of claim 19 wherein the at least one processor is configured to perform operations further comprising:

performing a general search on the general search information based on the received keyword; and making perceivable general search results identified based on performing the general search on the general search information.

* * * * *